United States Patent [19]

Ferguson

[11] Patent Number: 5,076,881
[45] Date of Patent: Dec. 31, 1991

[54] APPARATUS FOR FABRICATING AN OPTICAL FIBER RIBBON

[75] Inventor: Stephen K. Ferguson, Buford, Ga.

[73] Assignee: AT&T Bell Laboratories, Murray Hill, N.J.

[21] Appl. No.: 591,173

[22] Filed: Oct. 1, 1990

Related U.S. Application Data

[62] Division of Ser. No. 379,529, Jul. 14, 1989, Pat. No. 4,980,007.

[51] Int. Cl.[5] .......................... B32B 5/00; G02B 6/06
[52] U.S. Cl. ................................. 156/436; 156/441; 156/179; 156/510; 156/522; 174/117 F; 385/114
[58] Field of Search ............... 156/176, 178, 179, 296, 156/181, 180, 267, 271, 259, 436, 441, 510, 522; 350/96.23; 174/117 F

[56] References Cited

U.S. PATENT DOCUMENTS

| | | |
|---|---|---|
| 3,743,560 | 7/1973 | Western . |
| 3,761,868 | 9/1973 | Hardesty et al. . |
| 3,802,974 | 4/1974 | Emmel . |
| 3,816,205 | 6/1974 | Krag et al. . |
| 3,823,047 | 7/1974 | Colombo . |
| 3,864,018 | 2/1975 | Miller . |
| 3,920,432 | 11/1975 | Smith . |
| 3,936,344 | 2/1976 | Ball et al. ........................ 156/436 X |
| 3,937,559 | 2/1976 | Ferrentino . |
| 3,984,172 | 10/1976 | Miller . |
| 4,000,384 | 12/1976 | Harlow . |
| 4,071,393 | 1/1978 | Amphlett ........................ 156/436 X |
| 4,096,010 | 6/1978 | Parham et al. .................. 156/436 X |
| 4,217,155 | 8/1980 | Fritz et al. . |
| 4,268,345 | 5/1981 | Semchuck . |
| 4,289,558 | 9/1981 | Eichenbaum et al. . |
| 4,302,065 | 11/1981 | Taylor . |
| 4,351,689 | 9/1982 | Elliott et al. . |
| 4,651,418 | 3/1987 | Hutchins . |
| 4,720,165 | 1/1988 | Tokuda et al. . |
| 4,793,688 | 12/1988 | Cannon, Jr. et al. . |

*Primary Examiner*—Michael W. Ball
*Assistant Examiner*—Jeff H. Aftergut
*Attorney, Agent, or Firm*—E. W. Somers

[57] ABSTRACT

A group of loose cabled optical fibers (32—32) destined to be terminated by a multi-fiber connector device is first fabricated into an optical fiber ribbon (30). The optical fibers of the group are threaded through portions of an organizing shuttle (20) and brought into planar juxtaposition with each other by the cooperation of a curved surface (112) and a burnishing bar assembly (98). As the organizing shuttle is caused to be moved along a track (42), the burnishing bar assembly causes the planar array of fibers to be embedded into an adhesive coating of a first binding tape (34) which is secured along the length of the track. In a preferred embodiment, a second tape (35) is applied over the fibers and the first tape. The ribbon is trimmed of excess longitudinal side portions of the binding tapes to provide a ribbon of desired width.

15 Claims, 5 Drawing Sheets

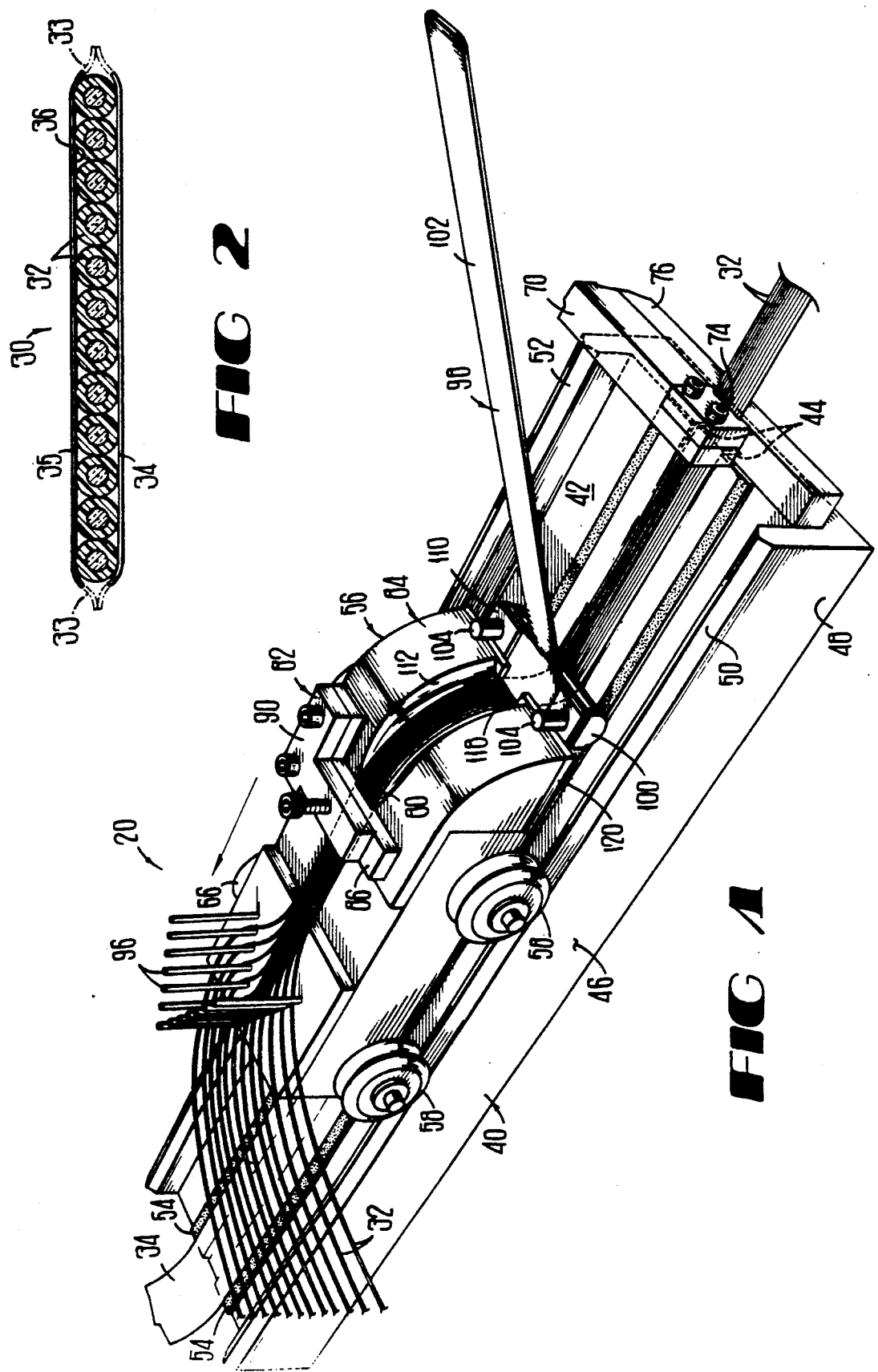

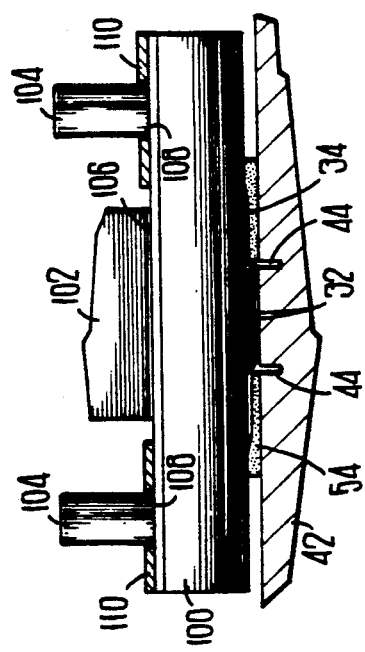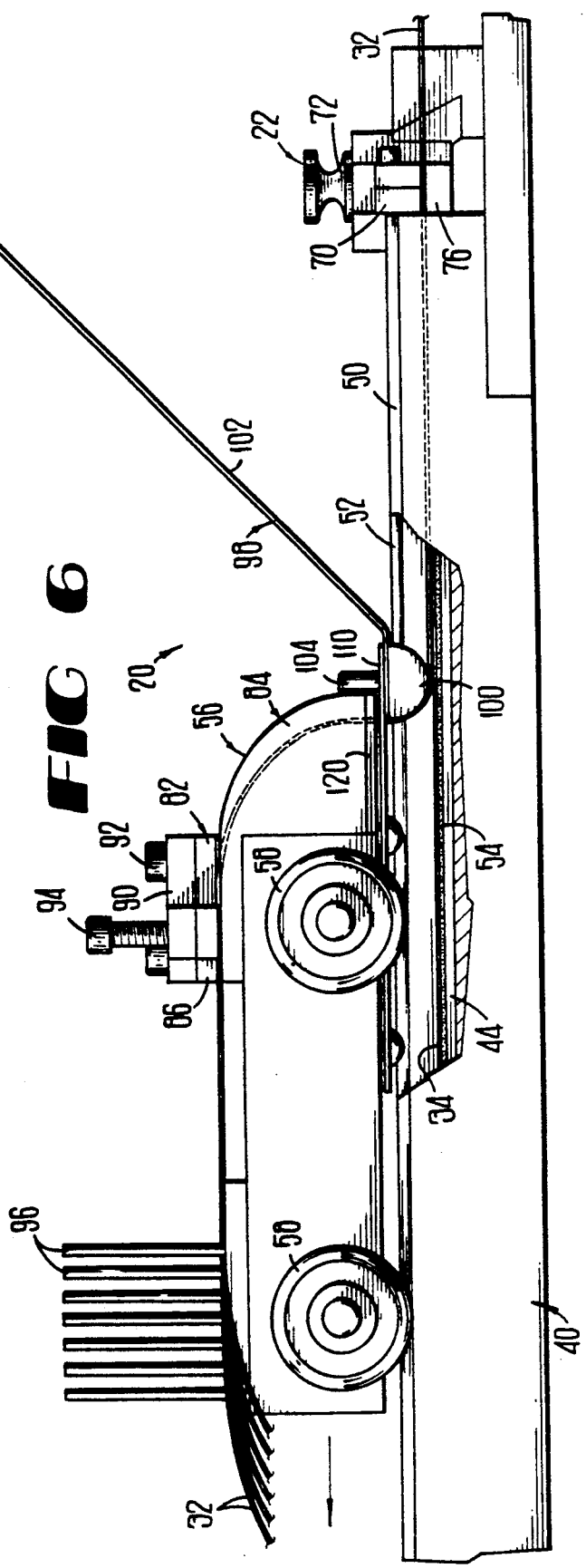

APPARATUS FOR FABRICATING AN OPTICAL FIBER RIBBON

This is a division of application Ser. No. 07/379,529 filed Jul. 14, 1989, now U.S. Pat. No. 4,980,007.

This invention relates to apparatus for providing a planar array of optical fibers. More particularly, it relates to apparatus for the organization and binding of predetermined optical fibers of a loose fiber optical fiber cable into a planar array for the purpose of connectorization.

BACKGROUND OF THE INVENTION

Optical fiber cables have been deployed extensively for long-haul trunking installations. Optical fiber cables used for these installations are typically high fiber count cables containing up to approximately one hundred fifty individual optical fibers with each fiber carrying high density, high data rate transmissions.

Optical fiber cables are now being used for local loop applications and are anticipated to be the media of choice for communications service to homes and businesses. As optical fiber cables are used more extensively in telecommunications service to homes and businesses, cable fiber counts are expected to increase. Optical fiber cables with fiber counts as high as five hundred are expected in the future.

One feature of high fiber count cables that must be addressed, however, is the organization of the individual fibers within the cable. Cable sheath size, splicing efficiency, and fiber mechanical integrity and optical performance are all influenced by cable designs necessary for a particular fiber count. During an optical fiber cabling operation, the optical fibers are typically divided into identifiable, longitudinally extending fiber units. A fiber unit is formed by any one of several methods. One method of forming a fiber unit is by wrapping a plastic color-coded roving material helically about a predetermined group of fibers. Another method is to extrude a solid, color-coded plastic tube about a group of fibers. Still another method is to create a ribbon fiber unit wherein a chosen group fibers, for example twelve fibers, are arranged in a planar array which is held together between two opposing adhesive backed plastic binding tapes as described in Eichenbaum et al., U.S. Pat. No. 4,289,558 issued Sept. 15, 1981. In the alternative, the array may be held together by extruding a polymeric bonding material into a nip formed between each pair of parallel fibers in contact with each other.

Transmitting and receiving electro-optic devices are connected to the ends of optical fiber cables and, in so doing, communications links are provided. The connection of these electro-optic devices as well as the concatenation of optical fiber cables may be effected by any of a number of methods. For example, a cabled fiber end may be spliced to an optical fiber pigtail attached to an electro-optic device by a process referred to as fusion splicing wherein two fiber ends are precision cleaved, held in close proximity and welded together by an electric or ignited gas arc. Fusion splicing may also be used to concatenate fibers of two or more optical cables.

Splicing may also be accomplished by the use of an index matching adhesive to bond fiber ends face to face. A rigid ferrule device is typically employed to maintain the alignment and mechanical integrity of the splice. Also, mating mechanical connectors may be adapted to ends of two fibers to be spliced and caused to be brought into engagement with one another as described in U.S. Pat. No. 4,793,683 which issued on Dec. 7, 1988 in the names of T. C. Cannon, Jr., B. V. Darden and N. R. Lampert.

Pluralities of optical fibers may be joined by utilizing a multifiber splicing device such as an AT&T array connector, for example, described in U.S. Pat. No. 3,864,018 which issued on Oct. 18, 1973 in the name of C. M. Miller. Use of the array connector allows the splicing of a plurality of fibers in a single operation. This method is particularly useful for the splicing of optical cables which include the ribbon fiber units described above.

During the process of applying array connectors to fiber ribbon units, the ribbon binding tapes are peeled from the ribbon fiber unit, exposing end portions of the optical fibers. The optical fiber end portions are stripped, cleaned and cleaved and then positioned in the grooves of a first one of two array chips in such a manner that the fiber end portions extend slightly past an end of the first chip. A second array chip which is also provided with a plurality of grooves is placed over the first array chip having the fiber end portions positioned therein. A curable adhesive is applied to the fibers in the location of the chips and this assembly, referred to as an array connector, is clamped and allowed to cure. After the adhesive is cured, the slightly extending fiber end portions are ground flush with the face of the chip assembly and the array connector assembly is complete.

Array connectors may be used with cables which do not include ribbon fiber units. It is possible to assemble unbound fibers with the array chips to effect connectorization, however, it is preferable first to bind the optical fibers extending from a cable sheath into ribbons and then proceed with the application of the array chips to form the array connector. In this way, an organized fiber ribbon extends from the array connector instead of a plurality of unbound fibers. This is advantageous because in the ribbon format, the entire ribbon acts as a strength member for each fiber of the ribbon. The risk of fiber breakage during array connector fabrication and cable use is therefore reduced when the ribbon format is used with the array connector.

Because slight variations in the structure of the ribbon can affect significantly the cable's optical performance, uniformity and reproducibility of the ribboning process is essential to the successful ribboning of the fibers of a loose fiber cable. Heretofore in the prior art, the ribbon making process was performed manually. High quality fabricated ribbons result from this prior art method; however, the time required to fabricate the ribbon is excessive. What is needed and what seemingly is nowhere shown in the prior art are apparatus and methods for at least a semi-automated ribbon fabrication of optical fibers of previously cabled optical fibers which are in non-ribbon form.

SUMMARY OF THE INVENTION

The foregoing problems of reproducible and time efficient optical fiber ribbon fabrication have been solved by ribbon fabrication apparatus of this invention.

End portions of a plurality of non-ribboned optical fibers of an optical fiber cable are exposed by removing a predetermined length of the cable sheath. The exposed fibers are segregated into groups with each group destined to be formed into a planar array. Fibers within the groups typically are color coded with either a uniform coating of ink, where a unique color is used for each individual fiber within the group, or with an interrupted or dashed coating of similar color inks applied to the fibers within each group. Fibers in each group are placed in engagement with a fiber organizing shuttle such that the fibers are arranged in a predetermined lateral ordering, for example by colored fiber ordering. As the shuttle is moved along a path of travel, a burnishing bar cooperates with the shuttle to cause the fibers to be embedded in an adhesive layer of a binding tape while maintaining the predetermined lateral fiber ordering. The tape with embedded fibers is trimmed of excess side portions to provide a precise width ribbon.

In the preferred embodiment, a second binding tape is placed over the first tape and fibers along the longitudinal axes of the fibers. The resulting assembly of two tapes with fibers disposed therebetween is trimmed of excess tape side portions to provide a ribbon of desired width.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of an optical fiber ribbon fabrication apparatus;

FIG. 2 is a cross-sectional view of an optical fiber ribbon unit;

FIG. 5 is an isolated section view of optical fibers embedded in a first binding tape;

FIG. 6 is a side elevational view partially in section of the optical fiber ribbon fabrication apparatus.

DETAILED DESCRIPTION

Figure 3:
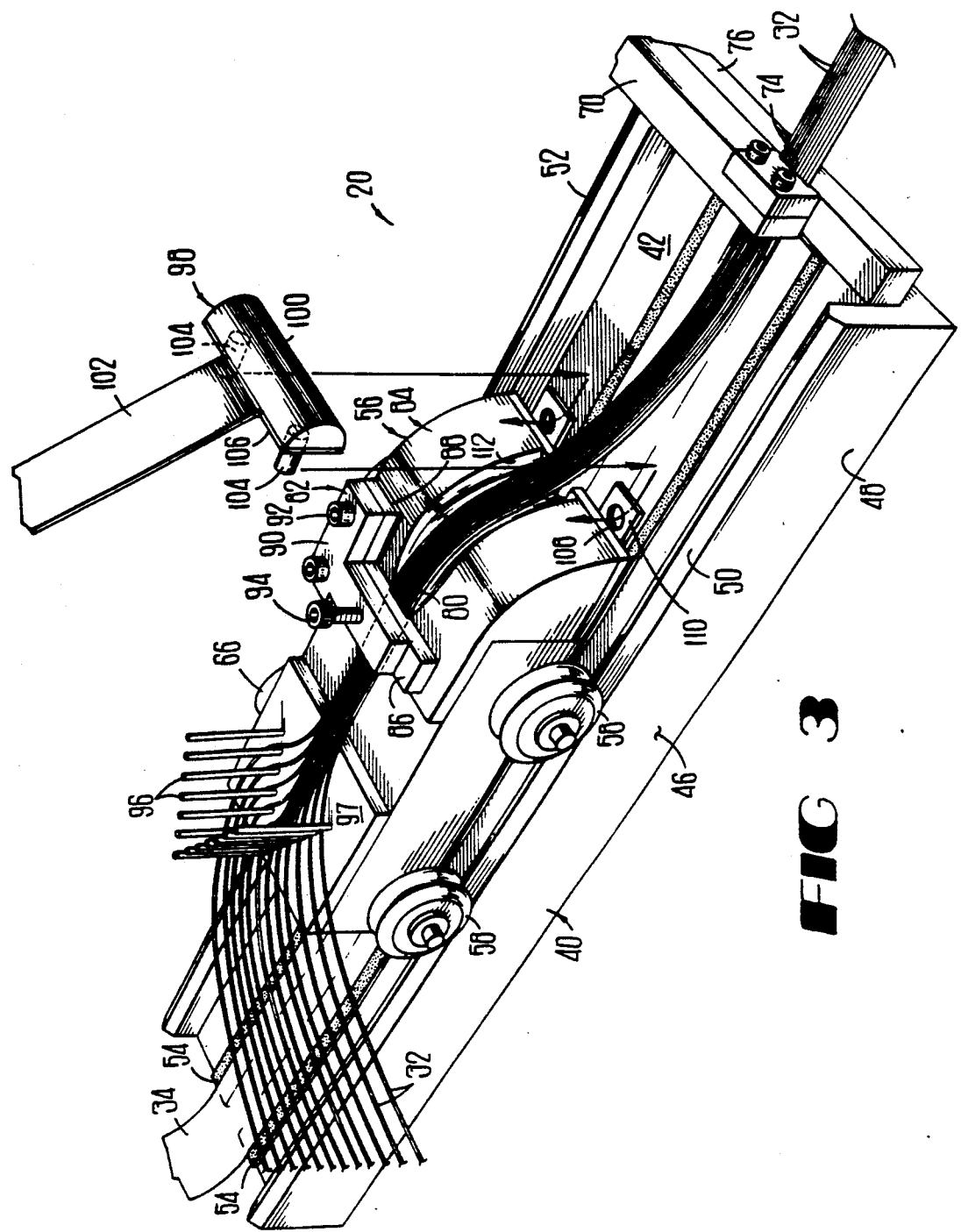
FIG. 3 is a perspective view of the optical fiber ribbon fabrication apparatus with a burnishing bar assembly in preparatory engagement with an organizing shuttle mounted on an assembly platen.

Referring now to FIG. 1 there is shown an optical fiber ribbon fabrication apparatus which is designated generally by the numeral 20. A cross sectional view of an optical fiber ribbon fabricated using the apparatus of FIG. 1 is shown in FIG. 2 and is designated generally by the numeral 30. The optical fiber ribbon 30 comprises a plurality of optical fibers 32—32 held together in a planar array with first and second ribbon tapes 34 and 35. In a preferred embodiment, the ribbon tapes 34 and 35 comprise a Mylar ® plastic material, a DuPont company film product. Each of the ribbon tapes 34 and 35 is coated on one side with an adhesive layer 36. The optical fibers 32—32 are engaged with the adhesive layer 36 of each tape and are thus held in planar juxtaposition with one another. In the preferred embodiment of the optical fiber ribbon 30, the adhesive coating layers of the ribbon tapes 34 and 35 do not engage each other. In another embodiment, shown in phantom lines in FIG. 2, the adhesive layers of the tapes are engaged at each side 33 of the ribbon 30. Another possible embodiment is the engagement of the optical fibers 32—32 with only one binding tape 34 as shown in FIG. 5 with or without the subsequent removal of excess binding tape at the edges of the ribbon.

At one end of the ribbon fabrication apparatus 20 which is depicted in FIG. 1 and also in FIG. 3, there is mounted a cable clamping device (not shown), the function of which is to clamp an end of an optical fiber cable which includes a sheath to prevent unintended cable movement during the ribbon fabrication process. The cable clamping device is located adjacent to a fiber clamping assembly 22 (see FIG. 4) and opposite an assembly platen 40. It should be understood that a predetermined length of the cable sheath is removed prior to clamping the cable so as to expose lengths of fibers which are to be formed into ribbons. After the cable is clamped, the exposed lengths of fibers are draped to a portion of the work area where they will not be damaged.

Figure 4:
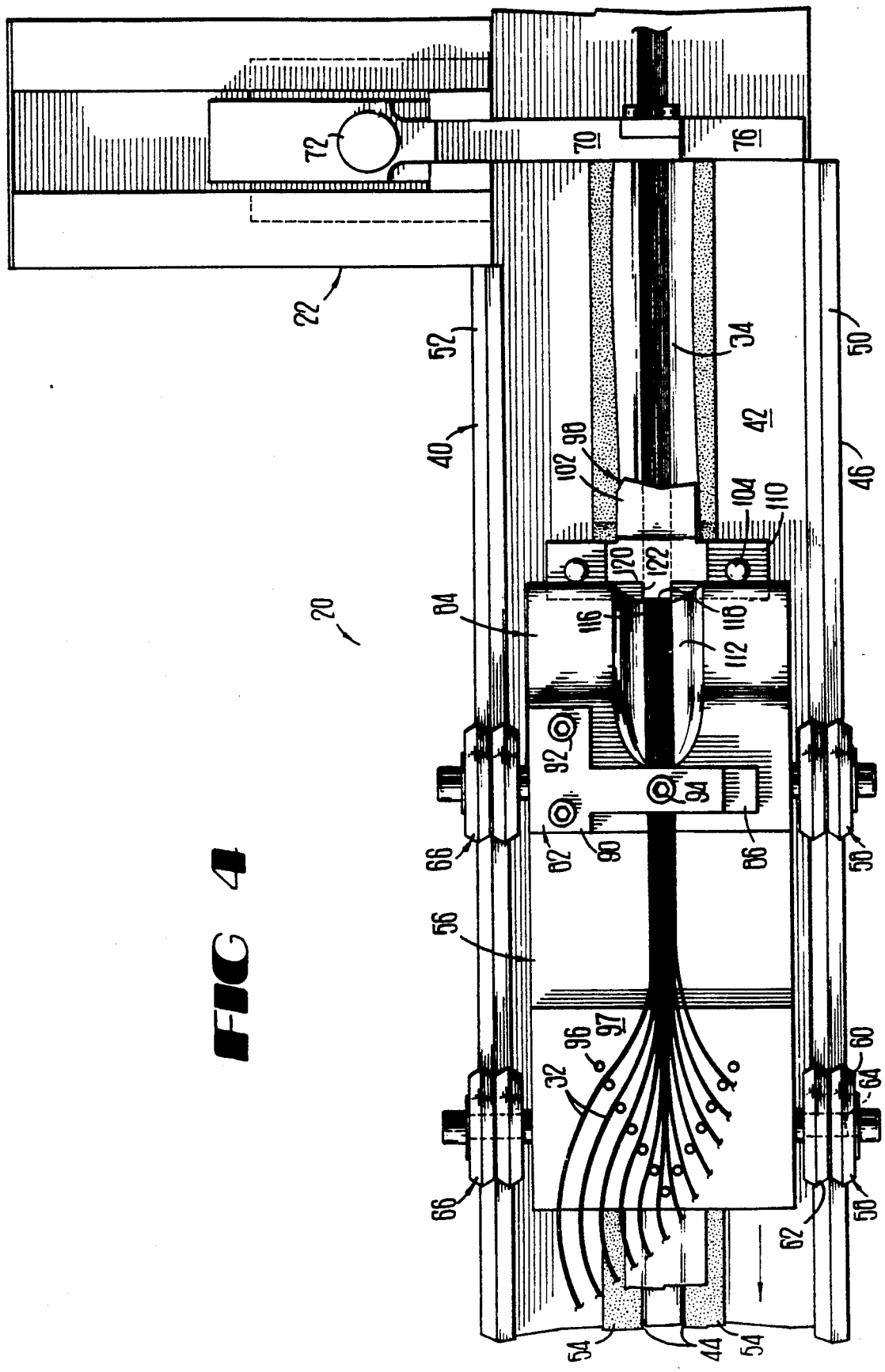
FIG. 4 is a plan view of an optical fiber ribbon fabrication apparatus.

The assembly platen 40 in a preferred embodiment as shown in FIGS. 1 and 3-4 is comprised of a track 42 the length of which is sufficient to accommodate a maximum ribbon length to be formed with the apparatus 20. Two longitudinally extending, relatively narrow, parallel grooves 44—44 (see also FIG. 5) are formed into an upper surface of the assembly platen 40. The grooves 44—44 are centered along the longitudinal center line of the assembly platen 40. The grooves define the width of an optical fiber ribbon 30 of the preferred embodiment. As can be seen in FIG. 1 and also in FIGS. 3-4, a reference guide rail 46 is rigidly attached to one side of and extends throughout the length of the track 42. The reference guide rail 46 is positioned precisely with reference to the adjacent groove 44. In a preferred embodiment, the reference guide rail 46 comprises a steel bar with a rectangular lower cross section profile 48 and a V-shaped upper cross section profile 50 (see FIG. 1). A secondary guide rail 52 is attached rigidly to a side of the track 42 that is opposite the side of the track 42 to which the reference guide rail 46 is attached.

The apparatus 20 also includes provisions for holding a length of the first tape 34 which is used to form the ribbon 30 (see FIGS. 3 and 5). In a preferred embodiment, two lengths of a holding tape 54—54 each approximately one half inch wide are caused to be positioned along and in engagement with an upper surface of the track 42 flanking the outermost longitudinal edges of the grooves 44—44. The holding tapes 54—54 have an adhesive coating on both sides so that the holding tapes are not only affixable to the upper surface of the track 42 but also present outwardly facing affixing surfaces parallel to the upper surface of the track.

Then a length of the first ribbon tape 34, which may be comprised of a 0.5 inch wide Mylar plastic tape with an adhesive coating on one side, is secured to the remaining outer portions of the holding tapes 54—54. The non-adhesive side of the first tape 34 is engaged along the entire lengths of the holding tapes 54—54 thus securing the first tape with its adhesive coating facing away from the upper surface of the track 42.

In an alternative embodiment, a holding means may be provided by a series of relatively small holes (not shown) disposed within a portion of the track 42 such that a tape holding area is defined. A sealed plenum (not shown) created within the body of the track 42 is effective to connect the holes to a common vacuum source. The tape 34 would thus be held in position in intimate contact with the top surface of the track 42 by a pressure differential created by the vacuum.

Those fibers 32—32 destined to be fabricated into ribbons 30—30 are first segregated into groups, each group representing all the fibers that will be included in an individual ribbon structure. In the preferred embodiment, the optical fibers 32—32 of a group to be formed into a ribbon are arranged in a unique lateral ordering determined by the preconceived fiber color coding scheme. The relative position of an optical fiber 32 in the final ribbon 30 is determined by that fiber's color. For instance, the preconceived color coding scheme may require that the leftmost fiber 32 of the ribbon 30, as viewed in FIG. 2, is the fiber which is colored red. Continuing with the scheme may require the next fiber 32 to be a fiber colored green. This scheme continues from left to right wherein each fiber position is occupied by a fiber of a predetermined, unique color. This lateral ordering insures fiber continuity cable end-to-cable end relative to the fiber array.

In stringing up the apparatus 20, a first fiber 32, as determined by the color coding scheme, is chosen from the previously segregated group of fibers by a workperson and passed through a gap 74 (see FIGS. 1 and 3) of a fiber clamp 70 of the fiber clamping assembly 22. Referring now to FIG. 6, there is shown the fiber clamp 70 of the fiber clamp assembly 22 (see FIG. 4) which is set in an open position by turning an adjusting screw 72. When the fiber clamp 70 is in the open position, the gap 74, the width of which is equal to approximately one and one-half optical fiber diameters, is formed between the fiber clamp 70 and a clamp support bar 76.

The fiber string-up continues past an organizing shuttle 56. The first fiber of the group is threaded through a gap 80 (see FIGS. 1 and 3) formed between a secondary organizer 82 mounted on an upper surface of the organizing shuttle 56 and an upper portion of an adjacent fiber converging block 84.

The organizing shuttle 56 is mounted movably on the assembly platen 40 and is adapted to be moved along the length of the track 42 being guided by the reference guide rail 46. As shown in FIG. 4, a plurality of reference wheels 58—58 are mounted rotatably individually on the organizing shuttle 56. Each reference wheel 58 comprises a disk 60 having a circumferentially located V-shaped groove 62 and mounting hole 64 extending along the rotational axis of the disk 60. The V-shaped grooves 62—62 of the reference wheels 58—58 are caused to be engaged with the V-shaped upper cross section profile 50 of the reference guide rail 46. The cooperation of the V-shaped grooves 62—62 and the V-shaped profile 50 causes precision relative motion between portions of the organizing shuttle 56 and portions of the track 42. A plurality of wheels 66—66 (see FIGS. 1 and 3) are mounted rotatably individually on the organizing shuttle 56 opposite the reference wheel 58—58 and are caused to become engaged with the guide rail 52.

Looking now at FIG. 3, the secondary organizer 82 comprises a deflection bar 86 spaced from an upper portion of the fiber converging block 84 by shim 88. The deflection bar 86 is preferably comprised of a low friction plastic material. A support bar 90 is disposed above and in engagement with the deflection bar 86. A plurality of screws 92—92 secures the deflection bar 86, the support bar 90 and the shim 88 to the upper portion of the fiber converging block 84. An adjusting screw 94 is threadably engaged with the support bar 90. The deflection bar 86 cooperates with the upper surface of the fiber converging block 86 to form the gap 80. The height of the gap 80 may be adjusted by means of the adjusting screw 94.

The secondary organizer 82 is effective in preventing the fibers 32—32 of a group from crossing over one another during the fiber string-up step and as the organizing shuttle 56 having the fibers strung therethrough is traversed along the assembly platen 40.

Continuing, the first fiber 32 is then positioned to extend between a plurality of pins 96—96 (see FIGS. 1 and 3-4) attached to the organizing shuttle 56 with each fiber disposed between a pair of the pins. As can be seen, the pins 96—96 extend perpendicularly to an upper surface 97 of the organizing shuttle 56. The optical fibers 32—32 are disposed between pairs of the pins 96—96 according to the predetermined lateral ordering that is used when stringing the fibers through the secondary organizer 82. As can be seen in FIG. 3, the optical fiber end is draped over a side of the assembly platen 40 such that damage to the fiber is avoided.

The above sequence is repeated for each fiber 32 of the group of fibers. When the string-up of all fibers is complete as shown in FIG. 3, the fiber clamp 70 is engaged with the fibers 32—32 by turning the adjustment screw 72 to cause a compressive force to be applied to the fibers which is adequate to prevent movement of the fibers between the fiber clamp 70 and the end of the cable sheath.

After the fibers 32—32 are properly disposed through the fiber clamp assembly gap 74, the secondary organizer gap 80 and the pins 96, a burnishing bar assembly 98 (see FIGS. 1 and 3) is engaged with the organizing shuttle 56. As is shown in FIG. 3, the burnishing bar assembly 98 comprises a solid bar 100 of semicircular cross section, a handle 102 and a plurality of engagement dowels 104—104 attached to the bar 100 perpendicular to a flat surface 106 that defines a portion of the semicircular cross section of the bar 100. The burnishing bar assembly 98 is adapted to become engaged with the organizing shuttle 56 by causing the engagement dowels 104—104 to be inserted into spaced openings 108—108 of a plurality of burnishing bar engagement tabs 110—110. The burnishing bar engagement tabs 110—110 are attached to an underside of the fiber converging block 84 of the organizing shuttle 56.

The burnishing bar assembly 98 is caused to become engaged with the burnishing bar engagement tabs 110—110 as shown in FIGS. 1 and 3. Prior to engagement, however, the secondary organizer adjustment screw 94 is adjusted to cause a compressive force to be applied to the optical fibers 32—32 in the secondary organizer gap 80 which force is such as to allow the fibers 32—32 to slip within the secondary organizer gap 80 when the fibers are subject to relatively moderate tension.

The end of the organizing shuttle 56 adjacent to the fiber clamp 70 is caused to be lifted such that the reference wheel 58 and the wheel 66 attached to that end of the organizing shuttle 56 disengage the reference guide rail 46 and the secondary guide rail 52, respectively. The reference wheel 58 and the wheel 66 located at the other end of the organizing shuttle 56 remain in contact with the reference guide rail 46 and the guide rail 52, respectively. The organizing shuttle 56 is moved to within approximately several inches of the fiber clamp 70 and the slack created in the fibers 32—32 due to the organizing shuttle 56 movement toward the fiber clamp 70 is removed by carefully pulling on the fibers 32—32 at a point between the distal end of the fibers 32—32 and the pins 96—96 preferably at a point just beyond the pins.

With the fibers 32—32 taut between the secondary fiber organizer 82 and the fiber clamp assembly 70, the dowels 104—104 of the burnishing bar assembly 98 are caused to become received in the burnishing bar engagement tab openings 108—108. This is accomplished by first engaging the bar 100 with the taut fibers 32—32 and deflecting the taut fibers so that the burnishing bar dowels 104—104 are directed first underneath the burnishing bar engagement tabs 110—110 and then up into the burnishing bar engagement tab openings 108—108. A completed engagement of the burnishing bar assembly 98 with the organizing shuttle 56 is shown in FIGS. 1 and 4. When the burnishing bar assembly 98 is engaged completely with the organizing shuttle 56 and the organizing shuttle is engaged fully with the assembly platen 40, the semicircular surface of the solid bar 100 will be in engagement with the adhesive surface 36 of the first ribbon tape 34. The compressive forces of the engagement of the solid bar 100 with the adhesive surface 36 is provided by the downward force exerted by the workperson on the organizing shuttle 56 but is limited by the spring constant of the burnishing bar engagement tabs 110—110.

As the burnishing bar assembly 98 is engaged with the burnishing bar engagement tabs 110—110, the fibers 32—32 are caused to become engaged with an organizing surface 112 of the fiber converging block 84. Referring to FIG. 1, in a preferred embodiment, the fiber converging block 84 comprises a plastic material with the surface 112 being convex in the direction of the longitudinal axis of the track 42 and being concave transverse to that longitudinal axis. The effect of engagement of the fibers 32—32 with the organizing surface 112 of the fiber converging block 84 is to cause the fibers 32—32 to be urged into a planar array 116 (see FIG. 4) wherein the fibers 32—32 are parallel and in contact with one another as shown in FIG. 4.

The planar array 116 is also caused to be disposed within a fiber guide positioner 118 (see FIGS. 1 and 4). The fiber guide positioner 118 is formed along one edge portion of a plate 120. The plate 120 is attached to a lower surface of the fiber converging block 84 such that edge surfaces 122—122 of the fiber guide positioner 118, constrain the planar array 116 to a particular portion of the organizing surface 112 of the fiber converging block 84.

The fiber guide positioner 118 is precisely located with respect to the reference guide wheels 58—58. Because the reference guide wheels 58—58 cooperate precisely with the reference guide rail 46 and the reference guide rail 46 is precisely located with respect to the grooves 44—44, the fiber guide positioner 118 hence is precisely located with respect to the parallel grooves.

As the organizing shuttle 56 is moved along its path of travel from the end of the track 42 which is adjacent to the fiber clamp assembly 22 to the opposite end of the track, the lengths of the exposed fibers 32—32 are caused to become embedded in the adhesive layer 36 along the longitudinal axis of the first ribbon tape 34 as shown in FIGS. 4, 5, and 6 precisely between the grooves 44—44.

In the preferred embodiment, a second length of adhesive coated Mylar plastic ribbon tape 35 of a length equal to that of the first ribbon tape 34 is applied to the first tape. First, the adhesive coated side of one end of the second ribbon tape 35 is engaged with the end of the first ribbon tape 34 adjacent to the fiber clamping assembly 22 so that the second ribbon tape fully overlays the first ribbon tape. The organizing shuttle 56, with the burnishing bar assembly 98 engaged with the burnishing bar engagement tabs 110, is engaged with the assembly platen 40 at that end adjacent to the fiber clamp assembly 22 and is advanced from one end of the assembly platen 40 to the opposite end. As a result, the second ribbon tape 35 is burnished to ensure engagement of the two ribbon tapes 34 and 35 with the optical fibers 32—32. The second ribbon tape 35 is then fully longitudinally engaged with the first ribbon tape 34 by progressively engaging the second ribbon tape with the first ribbon tape 34 along the length of the first ribbon tape.

Figure 7:
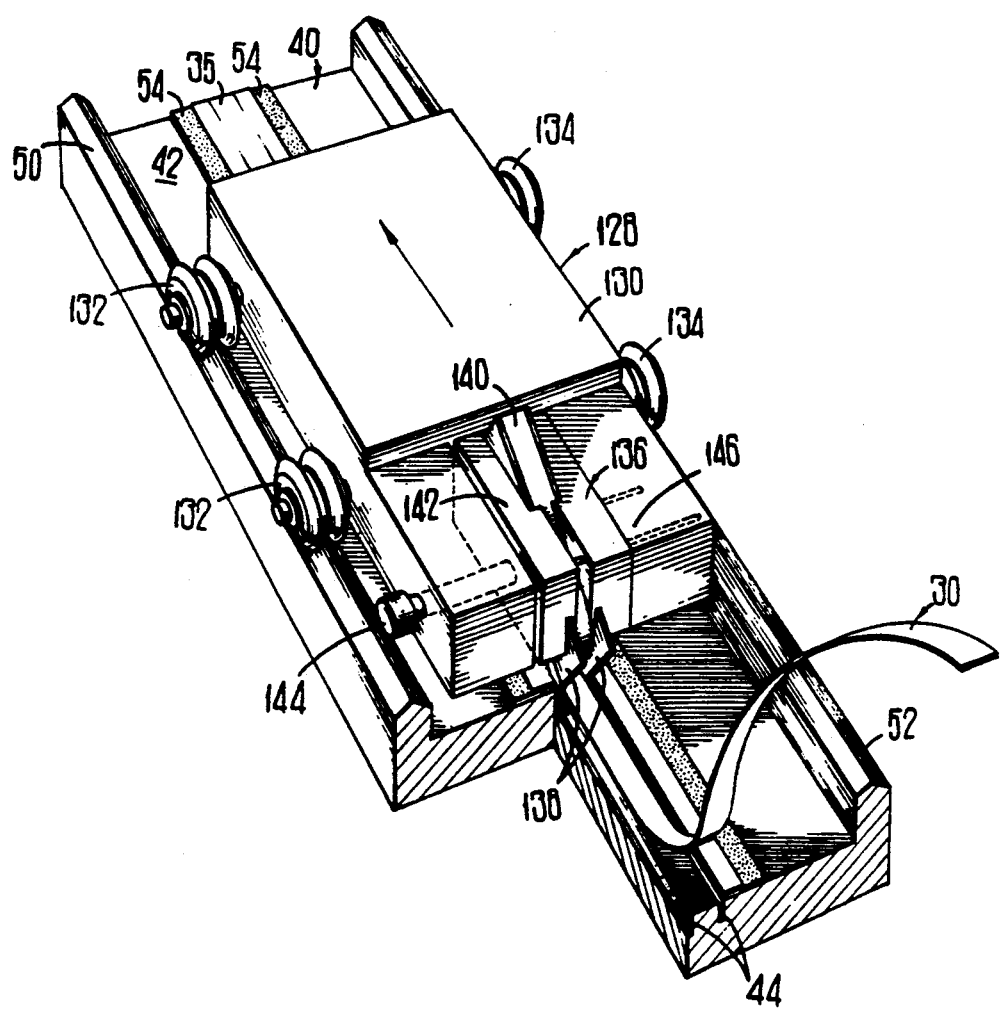
FIG. 7 is a perspective of a trimmer shuttle in engagement with the assembly platen.

The array structure is then trimmed of excess portions of the ribbon tapes 34 and 35. Referring now to FIG. 7, there is shown a trimmer shuttle 128 mounted in movable engagement with a portion of the assembly platen 40. The trimmer shuttle 128 is comprised of a trimmer body 130, a plurality of trimmer reference wheels 132—132, a plurality of wheels 134—134 mounted rotatably to the trimmer body and a trimmer blade assembly 136 attached to the trimmer body.

The trimmer blade assembly 136 comprises a pair of blades 138—138, each adapted to be received by one of the grooves 44—44, a blade spacer 140 which is disposed between the blades and which causes the blades to be spaced a predetermined distance apart. The predetermined distance is equal to the distance between the grooves 44—44. Also, the trimmer blade assembly 136 includes two blade clamping plates 142—142 between which are disposed the blades 138—138 and the blade spacer 140. A blade clamping screw 144 is threadably mounted in a portion of the trimmer body 130.

The trimmer blade assembly 136 is positioned within a portion 146 of the trimmer shuttle 128 and secured by tightening loosely the clamping screw 144. The trimmer blade assembly 136 is positioned in the trimmer shuttle portion 146 such that the trimmer blade 138 which is adjacent to a reference wheel 132 is located a precise distance from that reference wheel 132. When the trimmer shuttle 128 is mounted on the assembly platen 40, the cooperation of the reference wheels 132—132 with the reference guide rail 46 allows the precise positioning of the trimmer blade 138 adjacent to the reference wheel 132 within the parallel groove 44 of the track 42 which is adjacent to the reference guide rail 46. The other trimmer blade 138 is positioned within the other, parallel groove 44 by virtue of the positioning caused by the blade spacer 140.

The blades 138—138 are also adjusted relative to the parallel grooves 44—44 such that a lower most cutting edge of each blade is disposed to a depth of approximately one half the overall groove depth.

The trimmer shuttle 128 is engaged with the assembly platen 40 with the trimmer blade end of the trimmer shuttle adjacent to the fiber clamp assembly 22. The trimmer blades 138—138 are caused to pierce the first and second ribbon tapes 34 and 35 (or only the ribbon tape 34 if a second tape 35 has not been applied). The trimmer shuttle 128 is then moved from one end of the assembly platen 40 to the other thereby causing excess longitudinal side portions of the ribbon tapes 34 and 35 to be trimmed. At this time, the fabrication of the optical fiber ribbon 30 is complete and it may be removed from the ribbon fabrication apparatus 20. Other optical fiber groups of the cable may now be fabricated into ribbons.

The trimmer shuttle 128 may also be used to facilitate the application of the holding tapes 54—54 to the upper surface of the track 42. A single holding tape, one inch in width for example, is applied to the track 42 parallel to the grooves 44—44 and evenly placed side-to-side.

The trimmer shuttle 128 (see again FIG. 7) is engaged at the end of the assembly platen 40 adjacent to the fiber clamp assembly 22 and is traversed throughout the length of the assembly platen. As a result, the trimmer shuttle 128 causes the holding tape to be slit along a path coincident with the grooves 44—44. As shown in FIG. 5, a center portion of the holding tape is removed by lifting one end of the center portion (not shown) and pulling it along the length of the assembly platen 40. Two spaced strips 54—54 of the holding tape 54 remain and are positioned such that they flank the outside edges of the grooves 44—44. If this method of applying the holding tapes 54—54 is utilized, the center portion of the holding tape must be removed to provide a necessary relief 150 for the fibers 32—32. The relief 150 is necessary to control the compressive forces of the burnishing bar assembly 98 which are applied to the fibers 32—32 as the fibers are being bedded into the first ribbon tape 34. Removal of the center portion of the holding tape also allows the easy removal of the ribbon 30 after trimming of excess longitudinal side portions of the tapes 34 and 35.

The use of the ribbon fabrication apparatus is not limited to the fabrication of an optical fiber ribbon 30 from optical fibers 32—32 disposed within a cable sheath. Other uses include, for example, the fabrication of an optical fiber ribbon 30 from uncabled lengths of optical fiber heretofore unbound with one another. In this use, the optical fiber ribbon 30 may be fabricated by securing one end of each of a predetermined number of optical fibers into the fiber clamp assembly 22 and proceeding with the ribboning process as described hereinbefore.

It is to be understood that the above-described arrangements are simply illustrative of the invention. Other arrangements may be devised by those skilled in the art which will embody the principles of the invention and fall within the spirit and scope thereof.

I claim:

1. An apparatus for fabricating a planar array of optical fibers which is bound with a tape, said apparatus comprising:
   a longitudinally extending assembly platen;
   fiber clamping means for securing portions of a plurality of optical fibers which are destined to be fabricated into a bound planar array against unintended movement;
   holding means for securing a tape, having an exposed adhesive coating on which the plurality of optical fibers are to be assembled, in stationary engagement with said assembly platen;
   an organizer adapted to be movably mounted on said assembly platen for organizing the plurality of optical fibers into the planar array; and
   bedding means adapted to be connected to said organizer and rendered effective as said organizer is moved along said assembly platen for causing the plurality of optical fibers to become embedded in the adhesive coating of the tape to provide a planar array.

2. The apparatus of claim 1, wherein
   the tape is a first tape and said holding means is effective for holding the first tape having an exposed adhesive coating on which a desired group of unbound optical fibers are to be assembled in engagement with said assembly platen; and wherein said bedding means is rendered effective as said organizer is moved along said assembly platen for causing the desired group of unbound optical fibers to become embedded in the adhesive coating of the first tape preparatory to a second tape with an adhesive coating being placed over and engaged with the group of fibers embedded in the adhesive coating of the first tape to provide a bound planar array.

3. The apparatus of claim 2, wherein said assembly platen comprises:
   a track comprising a rigid material and having a minimum length which is greater than a maximum desired length of the planar array;
   a reference guide rail extending longitudinally with said track, said guide rail being effective to guide said organizer mounted on said assembly platen along a desired path; and
   said track including a pair of grooves formed in an upper surface of said track, being formed to a predetermined depth and extending along the length of said assembly platen, said grooves being parallel and spaced a predetermined distance apart.

4. The apparatus of claim 3, wherein said predetermined distance between said grooves is substantially equal to a desired width of the planar array, and wherein one of said grooves adjacent to said reference rail being a predetermined distance from said guide rail.

5. The apparatus of claim 4, wherein said organizer comprises:
   a body portion;
   at least one follower mounted to said body portion and adapted to engage said reference guide rail and to be moved therealong as said organizer is moved along said track;
   a plurality of pins attached to said body portion, said pins being effective to prevent tangling of optical fibers which become disposed in engagement with said organizer;
   a converging fiber guide which includes a surface which is convex in a direction of the longitudinal axis of said track and which is concave in a direction transverse to the longitudinal axis of said track, said converging fiber guide being effective to cause a plurality of substantially parallel optical fibers to converge into a planar array as said organizer is moved along said track;
   a plurality of bearing surfaces mounted to said body portion and adapted to engage a surface of the assembly platen and effective to support said body portion; and
   a fiber guide positioning means attached to said converging fiber guide and being effective to locate said planar array of optical fibers a predetermined distance from said at least one follower.

6. The apparatus of claim 5, wherein said plurality of bearing surfaces are adapted to engage a guide surface attached to said assembly platen.

7. The apparatus of claim 5, wherein said plurality of organizer pins are mounted to the body portion and extend perpendicular thereto.

8. The apparatus of claim 7, wherein said organizer pins are arranged along two intersecting planes in a V-shaped array.

9. The apparatus of claim 5, wherein said fiber guide positioning means is effective to cause the planar array of optical fibers to be positioned with respect to the first tape so that said bedding means causes the array to be embedded in the adhesive coating of the first tape between said grooves of said track.

10. The apparatus of claim 2, wherein said bedding means engages the group of unbound optical fibers after the fibers of the group have been moved together and into a planar array and prior to the group of fibers being moved into engagement with the adhesive coating of the first tape.

11. The apparatus of claim 10, wherein said bedding means cooperates with said organizer as said organizer is moved along said track to cause the unbound optical fibers to become embedded in the adhesive coating of the first tape.

12. The apparatus of claim 11, wherein said bedding means is maintained in a controlled compressive engagement with the adhesive coating of the first tape.

13. The apparatus of claim 2, which also includes a ribbon trimming device adapted to be movably mounted on said assembly platen, said device being effective for severing the first and second tapes along a longitudinal path parallel to said bound planar array of optical fibers to facilitate removal of excess lateral portions of the first and second tapes from the bound planar array to provide a planar array of desired width, said ribbon trimming device comprising:

a trimmer body;

at least one follower which is mounted rotatably on said trimmer body and which engages and which is adapted to be moved along said reference guide rail of said assembly platen;

a pair of cutting blades secured to said trimmer body and being effective to sever the first and second tapes which bind a planar array of fibers, one of said blades being adjacent to said at least one follower;

a cutting blade positioning device attached to said trimmer body which is effective to secure and position said cutting blades; and a plurality of bearing surfaces mounted to said trimmer body, said bearing surfaces being adapted to engage a surface of said assembly platen and being effective to support said trimmer body.

14. The apparatus of claim 13, wherein said plurality of bearing surfaces are adapted to engage a guide surface attached to said assembly platen.

15. The apparatus of claim 13, wherein the cutting blade which is adjacent to said at least one follower is a predetermined distance from said at least one follower, and said cutting blades are positioned in said cutting blade positioning device a predetermined distance apart by a cutting blade spacer such that said cutting blades become disposed in said grooves of said assembly platen when said at least one follower of said trimmer becomes engaged with said assembly platen reference guide rail.

* * * * *